(12) United States Patent
Scholte-Wassink

(10) Patent No.: US 8,004,100 B2
(45) Date of Patent: Aug. 23, 2011

(54) MODEL BASED WIND TURBINE DRIVE TRAIN VIBRATION DAMPER

(75) Inventor: Hartmut Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 673 days.

(21) Appl. No.: 12/048,607

(22) Filed: Mar. 14, 2008

(65) Prior Publication Data
US 2009/0230681 A1 Sep. 17, 2009

(51) Int. Cl.
F03B 9/00 (2006.01)
(52) U.S. Cl. ............................................. 290/44; 290/55
(58) Field of Classification Search .................... 290/44, 290/55; 415/122.1, 119; 416/170 R, 500
See application file for complete search history.

(56) References Cited

U.S. PATENT DOCUMENTS

| 5,083,039 | A | * | 1/1992 | Richardson et al. | ............ 290/44 |
| 7,183,664 | B2 | * | 2/2007 | McClintic | ....................... 290/55 |
| 2006/0033339 | A1 | | 2/2006 | Pasuri | |
| 2006/0244425 | A1 | | 11/2006 | Sihler | |
| 2007/0205602 | A1 | * | 9/2007 | Willey et al. | ..................... 290/44 |
| 2009/0169379 | A1 | * | 7/2009 | McClintic | ....................... 416/31 |

FOREIGN PATENT DOCUMENTS

WO WO99/36695 A1 7/1999

* cited by examiner

*Primary Examiner* — Tho D Ta
(74) *Attorney, Agent, or Firm* — Global Patent Operation; Douglas D. Zhang

(57) ABSTRACT

The invention concerns a method for reducing mechanical oscillation in a wind power plant which comprises a plurality of rotor blades, a wind turbine drive train and a generator, wherein the rotor blades are rotatably connected to the generator by the wind turbine drive train. The method comprises the steps: mathematically modeling the dynamical response and/or transfer function of a group of rotatable parts of the wind power plant, the group of rotatable parts comprising at least the wind turbine drive train, and determining dynamical response and/or transfer function of the group; in operation of the wind power plant, determining a first parameter characteristic of the mechanical oscillation at a first location, controlling the operation of at least one rotatable part in response to the dynamical response and/or transfer function of the group and at least the first parameter. In effect, resonance induced mechanical wear is reduced which leads to an increased life time of the wind power plant.

20 Claims, 2 Drawing Sheets

MODEL BASED WIND TURBINE DRIVE TRAIN VIBRATION DAMPER

BACKGROUND OF THE INVENTION

The present invention relates to wind turbines and wind power plants. Particularly, the invention relates to a method for reducing mechanical oscillation in a wind power plant. Specifically, the invention relates to a wind power plant and a method of operating a wind farm comprising a plurality of wind power plants.

Over the past year, wind turbines have increased in size and rated power. Thereby, mechanical stress has also increased on the construction parts like the rotatable parts of the wind power plant, correspondingly. In particular, highly turbulent or unsteady wind conditions may introduce vibrations and oscillations into the wind power plant and thus may lead to heavy mechanical wear thereof. The mechanical stress may be compensated by providing additional material strength and higher quality materials. This however leads to considerably higher production costs and may still not provide for the necessary reliability as expected from these systems. Thus, larger dimensioning of the parts and increasing the material strength may reduce the competitiveness of wind power plants in comparison to other ways of generating energy and thus may not provide for a satisfying solution.

SUMMARY OF THE INVENTION

In view of the above, according to one embodiment, a method for reducing mechanical oscillation in a wind power plant comprises a plurality of rotor blades, a wind turbine drive train and a generator, wherein the rotor blades are rotatably connected to the generator by the wind turbine drive train, wherein the method comprises the steps of mathematically modeling the dynamically response of a group of rotatable parts of the wind power plant, the group of rotatable parts comprising at least the wind turbine drive train, and determining the dynamical response and/or transfer function of the group; in operation of the wind power plant, determining a first parameter characteristic of the mechanical oscillation at a first location; controlling the operation of at least one rotatable part in response to the dynamical response and/or transfer function of the group and at least the first parameter.

According to a further embodiment, a wind power plant comprises a plurality of rotor blades, a wind turbine drive train and a generator, wherein the rotor blades are rotatably connected to the generator by the wind turbine drive train, the wind power plant further comprising a central control unit for controlling the operation of the wind power plant, the central control unit comprising a modeling module for providing a dynamical response and/or transfer function of at least a group of rotatable parts of the wind power plant based on a mathematical module, the group of rotatable parts comprising at least the wind turbine drive train; a first detector for determining, in operation of wind power plant, a first parameter characteristic of the oscillation at a first location; and a controlling module for controlling the operation of at least one rotatable part in response to the dynamical response and/or transfer function of the group and at least the first parameter.

Yet further embodiments are directed to methods of operating a wind farm comprising a plurality of wind power plants, the methods applying the methods for reducing mechanical oscillation as described herein.

Further embodiments, aspects, advantages and features which can be applied alone or can be combined in any suitable manner are apparent from the description, the accompanying drawings and the dependent claims.

BRIEF DESCRIPTION OF THE DRAWINGS

Further aspects and developments which can be combined in any suitable manner with the other aspects as described in this application, the specification and the claims, are described in the figures, wherein:

DETAILED DESCRIPTION OF THE INVENTION

Figure 1:
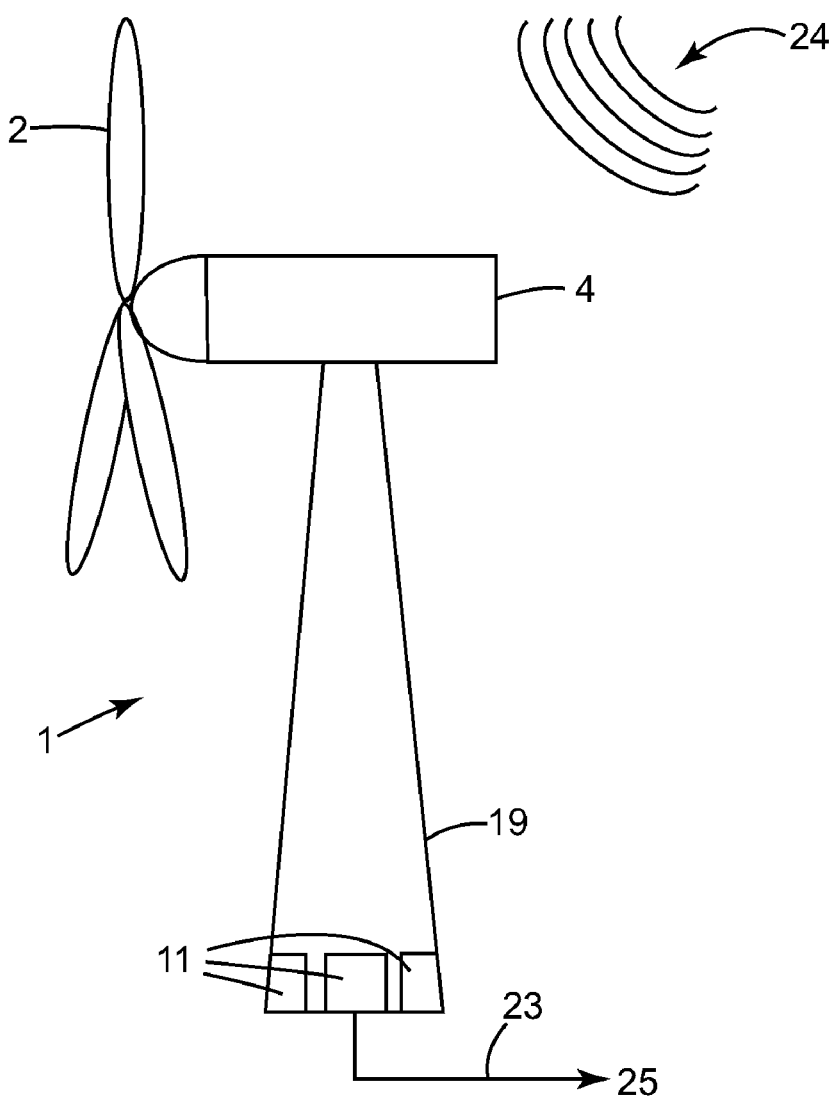
FIG. 1 shows a schematic drawing illustrating a wind power plant in a side view including an active damper or system for damping respectively reducing mechanical oscillation in the wind power plant according to embodiments described herein.

A full and enabling disclosure of the present invention including the best mode thereof, to one of ordinary skill in the art is set forth more particularly in the remainder of the specification, including reference to the accompanying figures. Reference will now be made in detail to the various embodiments of the invention, one or more examples of which are illustrated in the figures. Each example is provided by way of explanation of the invention and is not meant as a limitation of the invention. For example, features illustrated or described as part of one embodiment can be used on or in conjunction with other embodiments to yield yet a further embodiment. It is intended that the present invention includes such modifications and variations.

Over the past year, modern wind power plants experience an increase in size, which includes an increase of the length of their rotor blades and in their rotor diameter. In the past years, megawatt and multi-megawatt wind power plants are commonly installed. Due to the large size and rated power the loads and the mechanical stress acting on the wind power plants and their components have significantly increased. In consequence, particularly when the wind conditions are turbulent or unsteady, the power plants have to cope with considerable mechanical vibrations and oscillations which tend to reduce the expected life time of the wind power plants.

According to embodiments described herein, the mechanical stress, which is understood to be forces or torques caused by wind acting onto the fixed, moveable or rotatable parts of the wind power plant, is reduced. Accordingly mechanical wear of these parts of the wind power plant can be substantially reduced.

An embodiment relates to a method for reducing mechanical oscillation in a wind power plant which comprises a plurality of rotor blades, a wind turbine drive train and a generator, wherein the rotor blades are rotatably connected to the generator by the wind turbine drive train. The method comprises the steps of mathematically modeling the dynamical response and/or transfer function of a group of rotatable parts of the wind power plant, a group of rotatable parts comprising at least the wind turbine drive train, and determining the dynamically response of the group; in operation of the wind power plant, determining a first parameter characteristic of the mechanical oscillation at a first location, controlling the operation of at least one rotatable part in response to the dynamical response and/or transfer function of the group and at least the first parameter.

Wind power plants convert a portion of the kinetic energy as contained in the wind into a more usable form of energy by a generator which is operatively connected to the rotor blades. The connection between the rotating rotor blades and the generator is established by the wind turbine drive train which includes a rotatable rotor shaft and may include a gear box if a frequency conversion is necessary in order for the generator to operate with optimum efficiency. The generator may be an electric generator for generating electric energy. The generator could also be a compressor for compressing a gas or a pump for pumping a liquid into a pressure reservoir in order to store the energy as potential mechanical energy in a pressure container.

As the system comprising rotor blades, the generator and the wind turbine drive train includes a number of movable and/or rotatable parts, the system is subjected to vibration and oscillation, when the wind acts onto the wind power plant and the rotor blades in particular. In consequence the wind may excite the system and drive it into resonance. In resonance, there is a resonance rise of oscillation amplitudes with regard to torques and forces respectively, and, the momentary forces and torques can exceed the exciting forces and torques by a factor of a multiple. This effect is particular prominent if the damping in the system is low. At the resonance frequency, the mechanical parts of the wind power plants are subjected to considerably higher stress implying a correspondingly increased mechanical wear which may eventually lead to a premature failure of the system.

The term "dynamical response" is closely related to the term "impulse response" and describes how the system responds when it is subjected to a general excitation. The dynamical response describes how the system behaves. The term "transfer function" is the mathematical representation of the relation between the input, i.e. the excitation in form of forces or torques induced by the wind, and the output, i.e. how the system rotates, vibrates and/or oscillates. Thus the transfer function of a system characterizes the system as such and may be (if the system behaves in a linear way) independent of the specific excitation. By mathematically modeling the dynamically response respectively the transfer function of the group of rotatable parts, the mechanical behavior of the group in operation is (at least to a large extent) predictable. In particular, by mathematically modeling the dynamically response of a group of rotatable parts which includes at least the wind turbine drive train, critical frequencies, such as the resonance frequencies, i.e. the so called eigenfrequencies of the system, can be located and identified. This knowledge can be used for predicting the behavior of the group and can be used for reducing the mechanical oscillation.

The first parameter can be a frequency, or, a phase and/or an amplitude. The parameter may be momentary or time averaged. The first parameter is measured at a first location. It may be measured at or somewhere along the wind turbine drive train, in or at a bearing or at the rotor blades.

With the knowledge on the dynamical response and/or transfer function of the group of rotatable parts, forces or torques can be applied to at least one rotatable part, e.g. to the wind turbine drive train, so as to cancel by destructive interference or dampen the mechanical oscillations. This is particularly useful if the destructive interference and/or the damping occurs at places that are mechanically particularly sensitive such as in the gearboxes, on the rotor blades in proximity of the rotor shaft etc. In consequence the mechanical oscillations can be substantially reduced or even prevented.

As the dynamical response and/or transfer function can be predicted by the mathematical module, it is not only possible to take measures against these oscillations after they have emerged, i.e. to react to a situation that has already come about. Instead it is possible to identify them beforehand and suppress them actively in advance, before they happen to develop.

For example if the generator is an electric generator, vibrational torques along the wind turbine drive train can be compensated for by an electronic torque control of associated with the electric generator before the vibrational torques along the wind turbine drive train are driven into resonance. Alternatively or in addition the pitch of the rotor blades or an eccentricity of an eccentric mass can be controlled so as to reduce or even prevent mechanical oscillation in advance.

In an embodiment, controlling the operation includes controlling the torque or the angular frequency in the wind turbine drive train by the generator.

In a further embodiment, controlling the operation includes controlling a blade pitch of at least one rotor blade or the position or motion of an eccentric mass. The pitch of the plurality of rotor blades may be different for the different rotor blades in order to reduce, compensate or even prevent the mechanical oscillation in the wind power plant.

By knowing the dynamical response and/or transfer function of the system, forces or torques may be superimposed onto the wind turbine drive train so as to put one or more nodal points of the resonant system at places that are critical with regard to a resonance rise or that are simply critical to mechanical oscillation such as to the gears or gear boxes. By placing the resonance nodes to a gear box, the gear box is protected from excessive resonance and thus has an increased lifetime. Beyond placing nodal points to critical locations and reducing the oscillations at these locations by destructive interference, the oscillations can also be actively damped meaning that the energy inherent to the resonance modes are taken out of the system by controlling the operation of the at least one rotatable part suitably.

In another embodiment, measuring the first parameter characteristic of the mechanical oscillation at the first location may be used for controlling the actual mechanical behavior of rotatable parts at a location other and potentially remote from the first location.

The expected or predicted dynamical response and/or transfer function of the subgroup may be specified by the resonance frequencies or eigenfrequencies of the subgroup.

In a further embodiment, the method comprises the step of, in operation of the wind power plant, determining a second parameter characteristic of the oscillation at a second location in the subgroup, and controlling the operation of at least one rotatable part taking into account the second parameter. The second parameter, similarly to the first parameter, can be a frequency, a phase or an amplitude, either of which may be momentary or time averaged. The operation of the at least one rotatable part may take into account the second parameter and thus maybe used for further compensating undesired oscillations or vibrations in the system.

In a yet further embodiment, the method comprises the step of, in operation of the wind power plant, determining a further parameter characteristic of the oscillation at a further location and a subgroup, and controlling the operation of at least one rotatable part taking into account the further parameter. The further parameter may be of the same kind as the first and second parameters.

The controlling the operation includes actively applying damping forces or damping torques to at least one of the rotatable parts. Alternatively or in addition the step of controlling the operation includes superimposing additional forces or damping torques to at least one of the rotatable parts in order to cancel by destructive interference or dampen the forces and/or torques at the critical locations.

In an embodiment, the step of mathematically modeling includes modeling the dynamical response and/or transfer function of an electric system component of the winds power plant. As the dynamical response and/or transfer function of the electronic system component may couple back to the dynamical response and/or transfer function of the mechanical system, modeling the electric system and including this information into the overall control helps identifying and reducing undesirable oscillations and vibrations as caused by unsteady or turbulent wind flow. The electric system component may be, the generator, a rectifier for rectifying the output of the generator, or, a DC-AC converter for converting the rectified output of the generator.

In a further embodiment, the step of mathematically modeling includes mathematically modeling of the rotor blades.

In yet a further embodiment, the step of mathematically modeling of the wind turbine drive train takes into account the mass distributions specific of the wind turbine drive train.

The parameter characteristic of the oscillation may be a frequency, a vibration amplitude or a phase.

In a further embodiment, a method of operating a wind farm comprises a plurality of wind power plants wherein the method applies the method for reducing mechanical oscillation as described before.

In yet another embodiment, a wind power plant comprises a plurality of rotor blades, a wind turbine drive train and a generator, wherein the rotor blades are rotatably connected to the generator by the wind turbine drive train, the wind power plant further comprising a central control unit for controlling the operation of the wind power plant, the central control unit comprising a modeling module for providing a dynamical response and/or transfer function of at least a group of rotatable parts of the wind power plant based on a mathematical module, the group of rotatable parts comprising at least the wind turbine drive train; a first detector for determining, in operation of the wind power plant, a first parameter characteristic of the oscillation of a first location; and a controlling module for controlling the operation of at least one rotatable part in response to the dynamical response and/or transfer function of the group and at least the first parameter. The modeling module provides the dynamical response and/or transfer function of the wind turbine drive train and may further include the dynamical response and/or transfer function of the rotor blades and the generator.

The dynamical response and/or transfer function of these parts is used for controlling the operation of at least one rotatable part, for example a gear box located along the wind turbine drive train, in order to reduce and/or even prevent vibrations or oscillations at mechanically sensitive places where the vibrations or oscillations would put the system under accesses mechanical wear.

The modeling module may either determine or provide the dynamical response and/or transfer function on an online basis, or, it may have the dynamical response respectively the transfer function of the group of rotatable parts stored in a memory.

In a further embodiment, the wind power plant further comprises a second detector for determining, in operation of the wind power plant, a second parameter characteristic of the oscillation of a second location. The wind power plant may comprise one or more further detectors for determining, in operation of the wind power plant, one or more further parameters characteristic of the oscillation at a further location of further locations.

The current dynamical state of the group of rotatable parts can be determined on the basis of the mathematical model and the measurement results of the at least one detector at the at least one location. In effect, the behavior of the system can be predicted, such that measures for actively damping or cancelling the vibrations or oscillations can be taken in advance.

At least one rotatable part is controlled by the controlling module so as to reduce vibrations and oscillations in or at the same or other rotatable part. The controlling module may be used for controlling the oscillation or vibration remote from the at least one rotatable part using the feedback which is established by the wind turbine drive train and the dynamical response and/or transfer function of the system.

The rotatable parts may be a rotor blade or an eccentric mass. The rotatable part may also be a component of the generator, the wind turbine drive train, or a gear box of the wind turbine drive train. The controlling module may further comprise an electronic torque control.

With help of the electronic torque control, the electric generator of the wind power plant can be used for actively providing torques and/or forces to the wind turbine drive train and in this way for damping or canceling vibrations or oscillations at mechanically sensitive areas.

FIG. 1 shows an exemplary embodiment of a wind power plant 1 having rotor blades 2 being driven by wind 24 for driving a generator 4 which converts a portion of the kinetic energy as contained in the wind 24 into usable electric power that is fed via a power line 32 into a public grid 25. The electric power generated by the wind power plant 1 is converted and controlled by electric system components 11.

Figure 2:
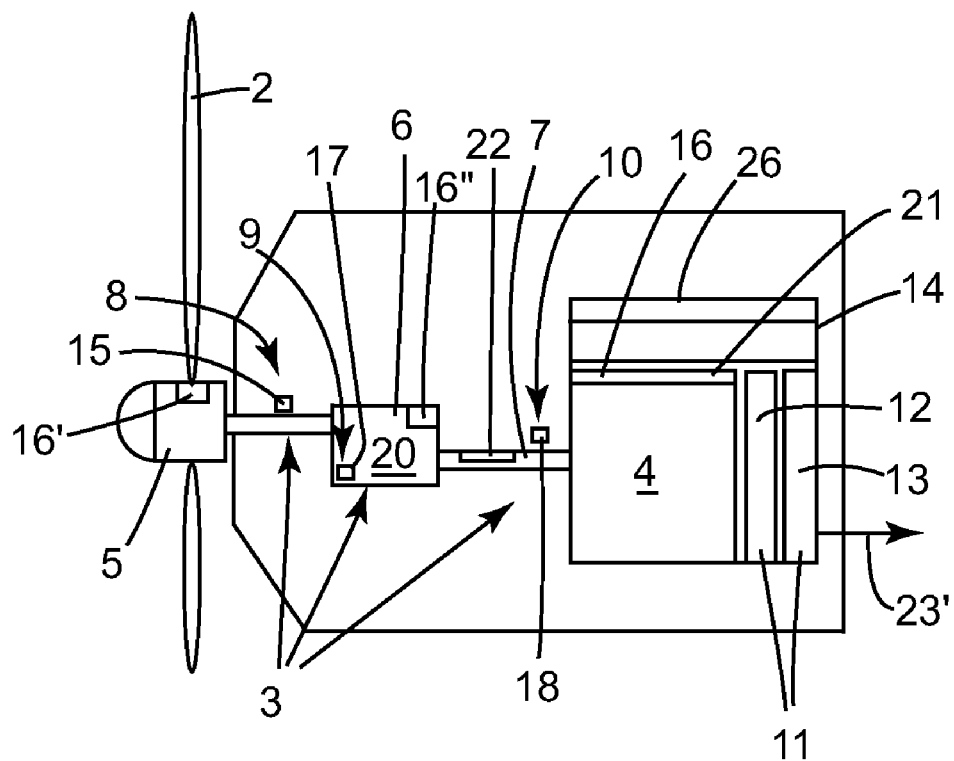
FIG. 2 shows a further schematic drawing illustrating a nacelle of the wind power plant according to FIG. 1 according to embodiments described herein.

FIG. 2 shows an embodiment of a nacelle with the rotor blades 2 being fixed to a first rotatable part 5 being a rotor shaft which is operationally connected to an electric generator 4 by the wind turbine drive train 3 which includes a second rotatable part 6 as gear box 20. The gear box 20 is connected to the electric generator 4 by a rotating shaft as third rotatable part 7. A first detector 15 determines a frequency spectrum at a first location 8 and a second detector 17 determines a second frequency spectrum within the gear box 20. A further detector 18 is located at a further location 10 for collecting further data such as a vibrational amplitude of the third rotatable part 7. The parameters detected by the detectors 15, 17, 18 are supplied to the central control unit 14 which includes a modeling module 26 for mathematically modeling the dynamical response and/or transfer function of the rotatable parts. The dynamical response and/or transfer function of the rotatable parts 5, 6, 7 is stored in a memory (not shown) of the modeling module 26. Depending on the dynamical response respectively transfer function and the input provided by the detectors 15, 17, 18 a controlling module 16, 16', 16" applies forces and/or torques effective at the individual rotatable parts 5, 6, 7 so as to reduce or even prevent oscillation at sensitive areas such as the gear box 20 or the rotor blades 12. By applying a suitable torque using an electric torque control 21 associated with the generator 4, a nodal point of the resonance system as represented by the wind turbine drive train 3 is shifted into the gear box 20 and thus protects the gear box 20 from being exposed to resonance induced wear. By applying suitable bearing forces to the rotatable parts 6, 7, the vibrations in gear box 20 are calmed down or damped with the controlling module 16". The third rotatable part 7 comprises an eccentric mass 22 in order to reduce vibrational modes along the third rotatable part 7. The pitch of the rotor blades 2 may be controlled by the controlling module 16 and undesirable vibrations in the first rotatable part 5 may be reduced therewith. The electric power provided by the generator 4 is further processed by electric system components 11 which are a rectifier 12 and a DC-AC converter 13. The so processed electrical power is fed via power line 23' to a transformer (not shown) in the base of the tower 19 of the wind power plant 1.

Based on the mathematical model, further to the information about the dynamical behavior of the rotatable parts of the wind power plant 1 also information on the dynamical behavior of the electric system components 11 can be derived and used for reducing oscillations or vibrations in the wind power plant 1. In effect, lifetime of the wind power plant 1 is prolonged.

An embodiment of the invention concerns a method for reducing mechanical oscillation in a wind power plant 1 which comprises a plurality of rotor blades 2, a wind turbine drive train 3 and a generator 4, wherein the rotor blades 2 are rotatably connected to the generator 4 by the wind turbine drive train 3. The method comprises the steps: mathematically modeling the dynamical response and/or transfer function of a group of rotatable parts 5, 6, 7 of the wind power plant 1, the group of rotatable parts 5, 6, 7 comprising at least the wind turbine drive train 3, and determining dynamical response and/or transfer function of the group; in operation of the wind power plant 1, determining a first parameter characteristic of the mechanical oscillation at a first location 8, controlling the operation of at least one rotatable part 4, 5, 6 in response to the dynamical response and/or transfer function of the group and at least the first parameter. In effect, resonance induced mechanical wear is reduced which leads to an increased life time of the wind power plant 1.

What is claimed is:

1. A method for reducing mechanical oscillation in a wind power plant comprising a plurality of rotor blades, a wind turbine drive train and a generator, wherein the rotor blades are rotatably connected to the generator by the wind turbine drive train, the method comprising:
    mathematically modeling at least one of dynamical response and transfer function of a group of rotatable parts of the wind power plant, the group of rotatable parts comprising at least the wind turbine drive train;
    determining the at least one of dynamical response and transfer function of the group;
    in operation of the wind power plant, determining a first parameter characteristic of mechanical oscillation at a first location; and
    controlling operation of at least one rotatable part in response to the at least one of dynamical response and transfer function of the group of rotable parts and at least the first parameter.

2. The method according to claim 1, wherein the controlling operation includes controlling a torque or an angular frequency in the wind turbine drive train by the generator.

3. The method according to claim 1, wherein the controlling operation includes controlling a blade pitch of at least one rotor blade or at eccentric mass.

4. The method according to claim 1, wherein the at least one of dynamical response and transfer function of the group is specified by the eigenfrequencies of the group.

5. The method according to claim 1, further comprising, in operation of the wind power plant, determining a second parameter characteristic of the mechanical oscillation at a second location in the group, and controlling the operation of the at least one rotatable part taking into account the second parameter.

6. The method according to claim 5, further comprising, in operation of the wind power plant, determining a further parameter characteristic of the mechanical oscillation at a further location in the group, and controlling the operation of the at least one rotatable part taking into account the further parameter.

7. The method according to claim 1, wherein the controlling operation includes actively applying damping forces or damping torques to the at least one rotatable part.

8. The method according to claim 1, wherein the mathematically modeling includes modeling the at least one of dynamical response and transfer function of an electric system component of the wind power plant.

9. The method according to claim 8, wherein the electric system component is a rectifier for rectifying an output of the generator or a DC-AC converter for converting the rectified output of the generator.

10. The method according to claim 1, wherein the mathematically modeling includes mathematically modeling of the rotor blades.

11. The method according, to claim 1, wherein the mathematically modeling includes mathematically modeling of the wind turbine drive train takes into account a mass distributions specific of the wind turbine drive train.

12. The method according to claim 1, wherein the first parameter characteristic of the mechanical oscillation is a frequency.

13. The method according to claim 1, wherein the first parameter characteristic of the mechanical oscillation is a vibration amplitude.

14. A method of operating a wind farm comprising a plurality of wind power plants, the method applying the method for reducing mechanical oscillation as defined in claim 1.

15. A wind power plant comprising a plurality of rotor blades, a wind turbine drive train and a generator, wherein the rotor blades are rotatably connected to the generator by the wind turbine drive train, the wind power plant further comprising a central control unit for controlling the operation of the wind power plant, the central control unit comprising:
    a modeling module for providing at least one of dynamical response and transfer function of a group of rotatable parts of the wind power plant based on a mathematical model, the group of rotatable parts comprising at least the wind turbine drive train;
    a first detector for determining, in operation of the wind power plant, a first parameter characteristic of oscillation of the wind power plant at a first location; and
    a controlling module for controlling operation of at least one rotatable part in response to the at least one of dynamical response and transfer function of the group of rotable parts and at least the first parameter.

16. The wind power plant according to claim 15, further comprising a second detector for determining, in operation of the wind power plant, a second parameter characteristic of the oscillation at a second location.

17. The wind power plant according to claim 16, further comprising a further detector for determining, in operation of the wind power plant, a further parameter characteristic of the oscillation at a further location.

18. The wind power plant according to claim 15, wherein the at least one rotatable part is a rotor blade or an eccentric mass.

19. The wind power plant according to claim 15, wherein the at least one rotatable part belongs to the generator, the wind turbine drive train, or a gear box of the wind turbine drive train.

20. The wind power plant according to claim 15, wherein the controlling module comprises an electronic torque control.

* * * * *

UNITED STATES PATENT AND TRADEMARK OFFICE
CERTIFICATE OF CORRECTION

| | |
|---|---|
| PATENT NO. | : 8,004,100 B2 |
| APPLICATION NO. | : 12/048607 |
| DATED | : August 23, 2011 |
| INVENTOR(S) | : Hartmut Scholte-Wassink |

Page 1 of 1

It is certified that error appears in the above-identified patent and that said Letters Patent is hereby corrected as shown below:

In Column 7, Line 43, in Claim 1, delete "rotable" and insert -- rotatable --, therefor.

In Column 7, Line 50, in Claim 3, delete "at" and insert -- an --, therefor.

In Column 8, Line 15, in Claim 11, delete "according," and insert -- according --, therefor.

In Column 8, Line 45, in Claim 15, delete "rotable" and insert -- rotatable --, therefor.

Signed and Sealed this
Twenty-ninth Day of November, 2011

David J. Kappos
*Director of the United States Patent and Trademark Office*